(12) United States Patent
Jalan et al.

(10) Patent No.: US 8,856,767 B2
(45) Date of Patent: Oct. 7, 2014

(54) SYSTEM AND METHOD FOR ANALYZING DYNAMIC PERFORMANCE OF COMPLEX APPLICATIONS

(75) Inventors: Rohit Jalan, Bangalore (IN); Arun Kejariwal, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 769 days.

(21) Appl. No.: 13/097,446

(22) Filed: Apr. 29, 2011

(65) Prior Publication Data
US 2012/0278793 A1 Nov. 1, 2012

(51) Int. Cl.
*G06F 9/45* (2006.01)

(52) U.S. Cl.
USPC ........... 717/158; 717/151; 717/153; 717/154; 717/155; 717/156; 717/157

(58) Field of Classification Search
None
See application file for complete search history.

(56) References Cited

U.S. PATENT DOCUMENTS

| | | | |
|---|---|---|---|
| 2003/0066055 A1* | 4/2003 | Spivey | 717/131 |
| 2004/0154019 A1* | 8/2004 | Aamodt et al. | 718/102 |
| 2006/0236309 A1* | 10/2006 | George | 717/133 |
| 2010/0211940 A1* | 8/2010 | Shih-Wei Liao et al. | 717/146 |

OTHER PUBLICATIONS

Valgrind User Manual, copyright 2007.*
Waddington et al., "Dynamic Analysis and Profiling of Multi-threaded Systems," copyright 2009.*
Chen, "SimSight: A Virtual Machine Based Dynamic Call Graph Generator," University of Nebraska—Lincoln, Aug. 1, 2010.*
Mirgorodskiy et al., "CrossWalk: A Tool for Performance Pro_ling Across the User-Kernel Boundary," Oct. 6, 2003.*
Tallent et al., "Effective Performance Measurement and Analysis of Multithreaded Applications," ACM, 2009.*
Weidendorfer, "Sequential Performance Analysis with Callgrindand KCachegrind," 2ndParallel Tools Workshop, HLRS, Stuttgart, Jul. 7-8, 2008.*
Xie et al., "An Empirical Study of Java Dynamic Call Graph Extractors," University of Washington Technical Report Feb. 12, 2003.*

* cited by examiner

*Primary Examiner* — Insun Kang
(74) *Attorney, Agent, or Firm* — Mauriel Kapouytian Woods LLP; Lana Akopyan

(57) ABSTRACT

A system and method for monitoring the performance and execution flow of a target application and generating a corresponding data model are provided. The system and method comprise attaching to a thread or process of a target application and tracking the execution of subroutines using instrumentation commands. Data representing the execution flow of the various subroutines, subroutine calls, and their performance is gathered and used to generate data models representing the threads and processes of the application. The data models are optionally merged and/or pruned. A visualization of the data models is generated indicating relevant points of interest within the target application's execution flow.

20 Claims, 13 Drawing Sheets

Node count: 12
Edge count: 11
Thread edges: 0
Multi-threaded app.: No
Recursive Nodes: 1
Recursive Edges: 1
Hot Node: mcf:primal_net_simplex
<6,606.714660s, 68.89%>
Hot Edge: mcf:global_opt→mcf:primal_net_simplex
<6,669.332590s,76.00%>

FIG.11

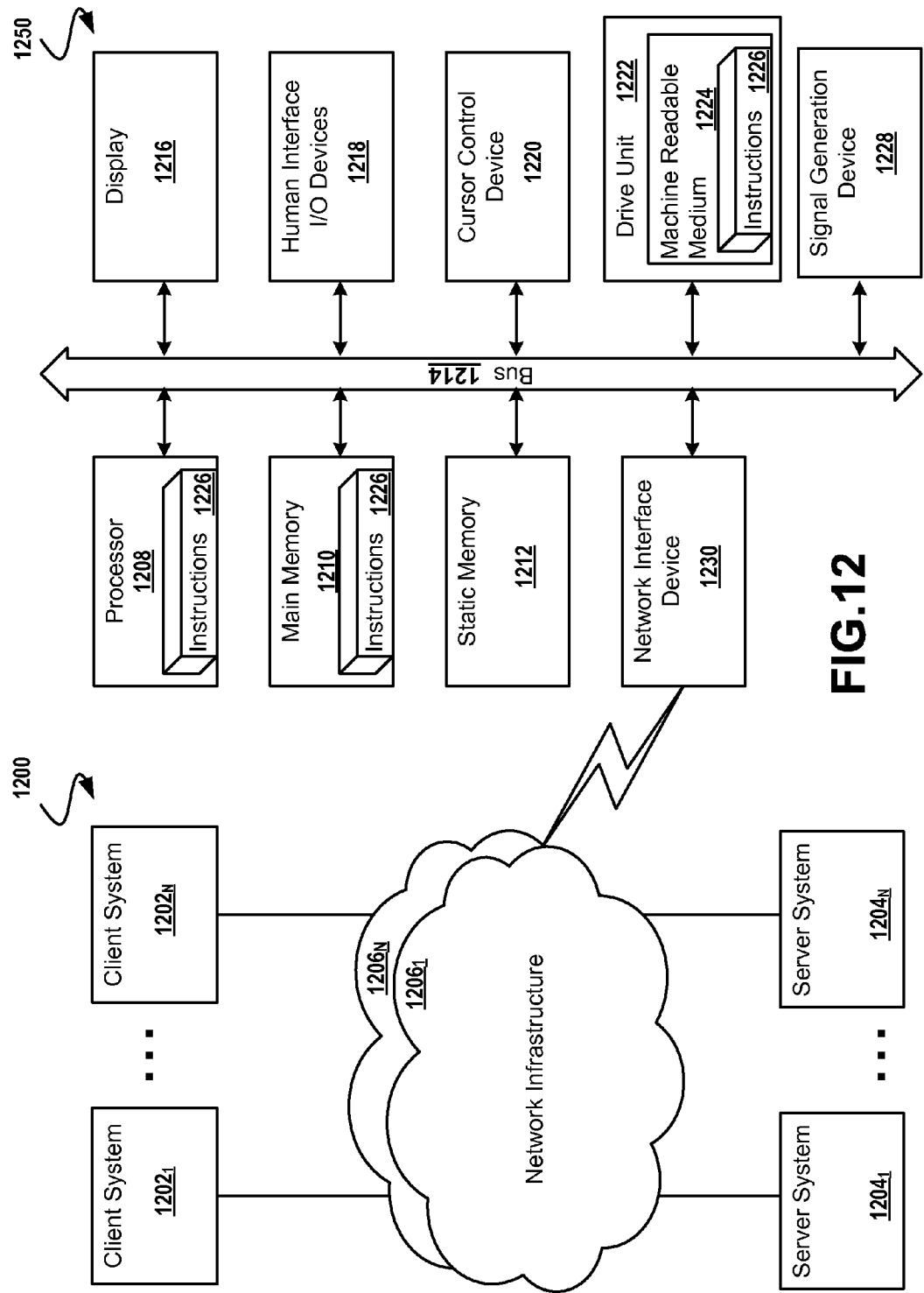

SYSTEM AND METHOD FOR ANALYZING DYNAMIC PERFORMANCE OF COMPLEX APPLICATIONS

FIELD OF THE INVENTION

The embodiments disclosed herein comprise a method and system for monitoring and analyzing the performance of complex applications. More particularly, the embodiments disclosed herein relate to a unique procedure for tracking, modeling, and analyzing and the performance of a target application by attaching to and detaching from the application as it executes and generating a data model representing the application's subroutine calls and execution flow.

BACKGROUND

Over the past three decades, computing, especially online computing, has proliferated to the point of ubiquity. Whereas computing and computer systems were initially common only in enterprise settings, most individuals and families today own and regularly use a networked computing device of some type. The emergence of the Internet has redefined the traditional paradigm of computing, shifting the locus of most computing tasks from non-networked mainframes or personal computers serving a limited number of users to networked server devices that serve potentially millions of users a day. In particular, the recent phenomenon of cloud computing has given rise to online portals and applications that run on server architectures and are used to provide specialized online services to millions of end users. One such portal, Yahoo.com, provides dozens of online applications performing a variety of different functions, such as YAHOO! Mail, YAHOO! Finance, YAHOO! Games, and YAHOO! Messenger. Due to the high volume of users that such online applications serve, slight improvements or degradations in an application's performance can have a significant effect on response time, stability, and other factors that affect user experience. In addition, the complexity of online applications has grown as application providers have sought to take advantage of hardware advances and increases in bandwidth and data transfer rates to provide increasingly sophisticated functionality to end users.

Thus, technologies that can effectively monitor and analyze the performance of an application have become increasingly important. Though such tools do exist, many currently available solutions have not kept pace with the growing sophistication of online applications. Currently available solutions do not provide a sufficient level of detail in their performance analysis, cause an unacceptable amount of disruption in the operation of the application, or add too much overhead to the application's running time. Consequently, there is a need for a technique for analyzing the performance of an application that provides low-level performance detail without disrupting operation or adding overhead. As will be demonstrated, the embodiments disclosed herein provide such a technique in an elegant manner.

SUMMARY OF THE INVENTION

The embodiments disclosed herein introduce a method and system for extracting a data model of a target application's performance and execution flow and creating a visualization of the extracted data model.

According to one series of embodiments, a profiler attaches to a target application. In one embodiment, the profiler attaches to a process. In another embodiment, the profiler attaches to a thread. The profiler inserts at least one instrumentation command into a portion of binary code of the target application preceding a call of a subroutine. The profiler increments a counter corresponding to a number of calls of the subroutine and starts a timer corresponding to a time of execution for the call. The profiler appends the call to a data structure, wherein the data structure tracks a call flow of the target application. Upon completion of the subroutine, the profiler stops the timer and builds the data model using the data structure. In one such embodiment, the data model is a call graph and the call graph corresponds to a single thread or process. In another such embodiment, the profiler accesses a subroutine filter and the subroutine is specified in the subroutine filter. In yet another such embodiment, a visualization and/or a summary of the data model is generated.

According to another series of embodiments, the profiler detects that the call is a recursive call. Upon detecting a recursive call, the profiler increments a counter corresponding to a number of levels of recursion in the application and pauses a prior timer corresponding to a most recent call of the subroutine. Upon completion of the subroutine, the profiler restarts the prior timer.

According to another series of embodiments, an analytics engine receives at least one related data model and relationship data corresponding to the data model and the related data model. The analytics engine determines, using the relationship data, a creating subroutine for each of the data model and the related data model. The analytics engine partitions, for each of the data model and the related data model, a first subroutine into a plurality of subsets, wherein each subset corresponds to a nesting level and each subset comprises at least one first subroutine. The analytics engine merges the first subroutines in each subset and a plurality of invocations corresponding to each subroutine. In one such embodiment, the analytics engine determines a threshold value and deletes at least one omitted subroutine and at least one omitted subroutine call from the data model, wherein the subroutine and the subroutine call do not meet the threshold. The analytics engine connects at least one orphaned subroutine to at least one ancestor subroutine.

BRIEF DESCRIPTION OF THE DRAWINGS

FIG. 11 depicts an example summary of a call graph according to en embodiment of the present invention.

FIG. 12 depicts a block diagram illustrating hardware embodiments of the present invention.

DETAILED DESCRIPTION

Figure 1:
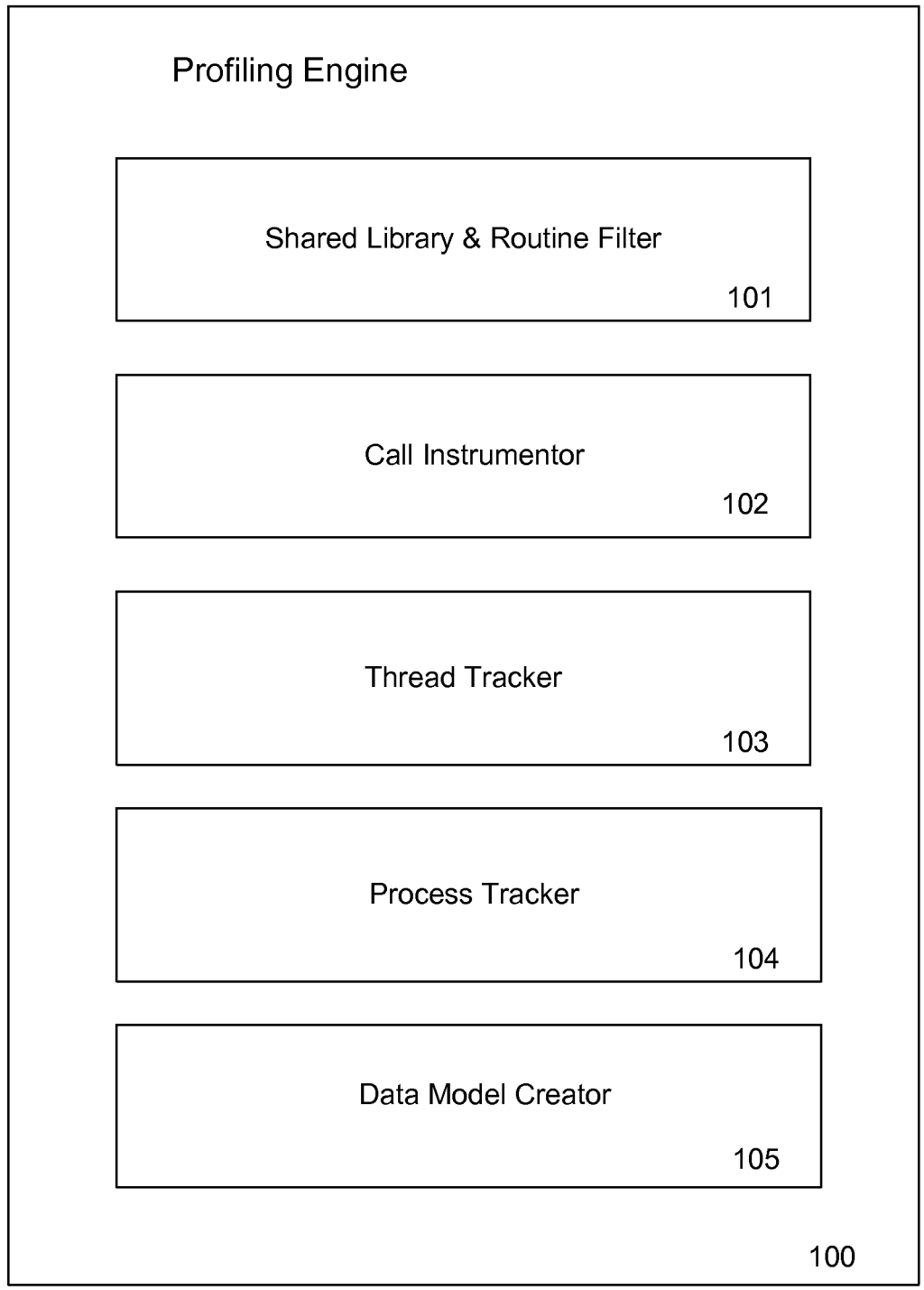
FIG. 1 depicts a block diagram illustrating a profiling engine according to an embodiment of the invention.

The emergence of the Internet has ushered in a new era of computing wherein numerous users can access an online application running remotely on a series of networked server devices. By taking advantage of multi-core processors and superscalar architectures that allow a high degree of parallelism and throughput, internet portals and service providers have developed sophisticated online applications that provide a variety of services to millions of end users around the world. As a result, online advertising, e-commerce, and subscription-based online services have evolved into fiercely competitive, multi-billion dollar a year industries.

The quality of the user experience associated with a particular online application is heavily dependent on its performance. If the users of an online application perceive the application to be slow due to lengthy processing times, they will abandon it in favor of a competing solution. Performance is also critical for services that deliver advertising to publishers and online portals. Personalized targeting of advertising entails many computationally intensive operations; optimizing these operations is imperative for services that serve millions of advertising impressions per day. Thus, application service providers, providers of content, and online portals that derive their revenue from subscriptions or advertising have an interest in ensuring optimal performance of their online applications. By minimizing latency and maximizing throughput, an online portal can provide a positive user experience and thereby help ensure continued user loyalty.

In addition, as the availability of internet access expands and technology continues to evolve, the traffic levels of many internet portals and service providers are growing exponentially. This has highlighted the need to optimize the performance of online applications. Because hardware resources cannot be continuously upgraded at the same pace as the rate at which user bases grow and the sophistication of applications evolves, software must be designed and updated to run as efficiently as possible. Many common instances of performance degradation can be pre-empted or resolved inexpensively through intelligent software design and optimization, avoiding the need for costly hardware upgrades.

Optimizing the performance of an application cannot be accomplished without understanding where the performance bottlenecks lie. An application comprises numerous functions and subroutines, and determining the portion of an application's execution time spent in each function or subroutine is crucial to identifying bottlenecks. Online services are powered by complex multi-threaded and multi-process applications with intricate flows of execution. Collection and analysis of this performance and execution data is typically done with profilers, software tools that monitor the performance of a program as it executes on a system. A profiler provides run-time data pertaining to the performance of an application, enabling a system user or administrator to determine the portions of an application's execution time spent in its various functions and subroutines. This information is often presented in the form of a call graph, a data structure that models the flow of execution of a running computer application. Though numerous profilers exist, many are ill suited for complex multithreaded online applications, indefinite monitoring periods, and production environments in which uptime cannot be sacrificed.

One variety of profilers relies on sampling and statistical analysis of sampled data. A sampling profiler accesses a target application's program counter during operating system interrupts and records the instruction currently being executed by the CPU at regular intervals over a time series. The profiler correlates the recorded execution data with the application source code and yields the approximate frequency with which a subroutine, function, or line of code within a program is executed. Because accessing an application's CPU counter is not a resource-intensive operation, sampling profilers add minimal overhead to the application's running time. One such profiler is the VTune™ Performance Analyzer produced by Intel.

One drawback of sampling profilers such as VTune™ is that the data they produce is often incomplete and imprecise. Many sampling profilers can determine which function or subroutine is being executed at a given moment, but cannot discern how it was invoked. The information yielded by sampling profilers is based on extrapolations of trends gleaned from the collected data. Furthermore, because sampling profilers collect data only at designated intervals, they may not detect irregularities that occur between intervals. Thus, a sampling profiler may be unable to capture variances in the performance of an application. For example, if a particular subroutine of an online application runs normally for five users of the application but lags for one user, the data yielded by a sampling profiler may not account for the performance lag experienced by that user. Any program optimizations performed based on such data may potentially be incomplete and ineffective.

Another drawback of profilers such as VTune™ is that they cannot be configured to execute for an indefinite period of time. Because sampling profilers are designed to collect data over a fixed length of time, the amount of disk space consumed by the collected data is proportional to the length of time that the target application is profiled. Thus, a sampling profiler cannot be set to run indefinitely or for a very lengthy period of time because it would eventually consume most or all of the disk space on the host system. This further limits the capability of sampling profilers to detect sporadic irregularities in the execution of an application that may be corrected by program optimizations.

Another variety of profilers relies on source code instrumentation, i.e., the insertion of tracking code into an application's source code that signals the execution of specific lines or subroutines. In many source code instrumenting profilers, this is done during program compilation by setting flags at various points within the application's source code. The user or administrator can collect specific data pertaining to the execution of particular subroutines, how they were invoked, and how long they took to execute. Source code instrumentation thus yields data that is more complete and precise than that of sampling profilers. One such source code instrumenting profiler is the gprof tool included with the GNU Compiler Collection (GCC).

However, source code instrumentation has a number of serious drawbacks that limit its effectiveness as a viable alternative to sampling. The inserted code adds significant overhead to the execution of the target application and can thus yield performance data that is skewed or inaccurate. Although the data can be adjusted to account for the impact of source code instrumentation, this introduces additional uncertainty into the profiling process and limits the relevance of the data for optimization purposes.

In addition, many source code instrumenting profilers are not suited for use in a production environment. Some source code instrumenting profilers are only intended for use during the testing phase. The data yielded by such profilers may be wholly irrelevant for complex applications whose performance is heavily dependent on factors specific to the environment in which they are deployed. Such applications may perform significantly differently in production than they do in a controlled test. Other source code instrumenting profilers may be used in production but cause significant disruption to the environment and the target application. Such profilers may require that an application be taken offline or restarted before profiling can commence. Others may require significant modification or restructuring of the production environment. Application providers who require maximum uptime and cannot afford a significant disruption in service cannot feasibly use such tools.

Thus, the design and implementation of the embodiments disclosed herein have been guided by the goal of providing tools to identify performance bottlenecks that eliminate the aforementioned shortcomings. Particularly, the embodiments disclosed herein provide novel techniques for: generating a precise data model and visualization representing the flow of execution of a given application in production; determining, on a per-thread or per-process basis, the coverage of each subroutine (i.e., the percentage that the run time of each subroutine comprises of the total run time of a given application); determining the run time spent by an application sleeping, waiting, or executing particular system calls while in production; determining the relative contribution of specific subroutines to a latency sensitive path in an application; and determining the benefits and drawbacks associated with a particular I/O or computation strategy. Information provided by a profiler configured according to any of the embodiments disclosed herein may be used to guide source code and compiler optimizations of a target application. Performance analysts and application developers may leverage the data to determine, for example, the number of helper threads that should be spawned within the target application.

A profiler configured according to any of the embodiments disclosed herein operates by attaching to a target application. The profiler may attach to an application thread or process at any point after the application has begun executing, obviating the need to terminate the application in order to commence or end profiling. Thus, the profiler and the target application do not need to be launched or terminated concurrently. The profiler may be deployed within an existing production environment without disrupting the target application or any other component within the environment. The attaching and detaching procedure has no effect on the execution of the target application and adds minimal overhead to the application's running time. While attached to a target application thread or process, the profiler collects performance data and tracks the subroutine calls of the attached thread or process, appending each call to a data model representing the execution flow of the application. According to one embodiment, the data model is a call graph. At any point, the profiler may detach from an attached thread or process without affecting its continued execution or that of the application as a whole.

Upon collecting the raw performance and subroutine data, the profiler processes, filters, and analyzes the collected data. The profiler may merge the data models of separate threads or processes and prune the merged data model to eliminate redundant or irrelevant data. The profiler may further calculate various metrics pertaining to each subroutine call, such as coverage and run time. Using the processed and filtered data model, a visual representation of the application's execution flow and subroutine calls is generated. According to one embodiment, the visual representation is a graphical illustration of a call graph. In this embodiment, the profiler may determine, for example, the hottest path in the call graph (i.e., subroutines that are called frequently or account for a large portion of the application's run time), the existence of cycles in the call graph, the depth of recursion, levels of multithreading, and the number of multithreaded contexts in which a subroutine was called.

Figure 2:
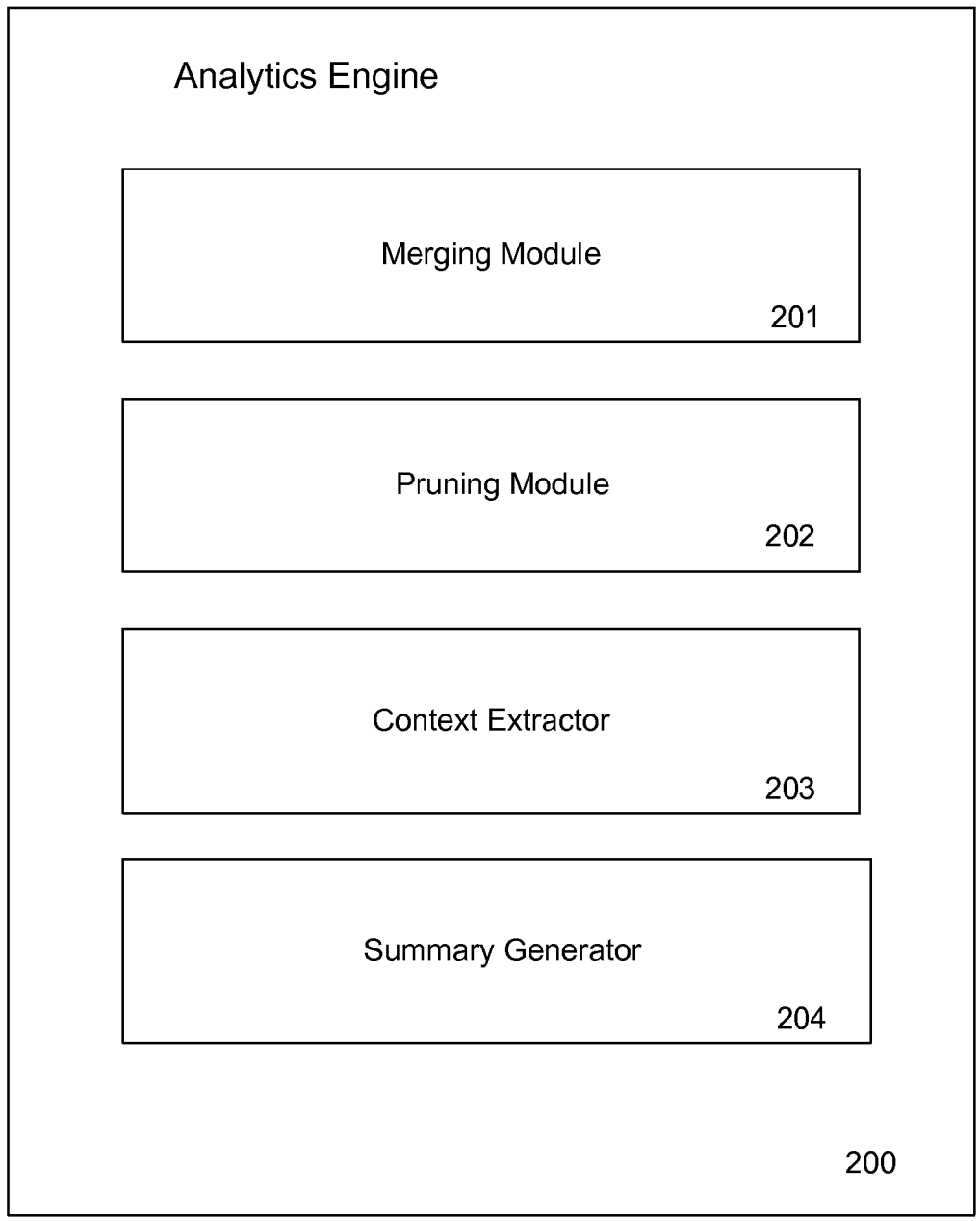
FIG. 2 depicts a block diagram illustrating an analytics engine according to an embodiment of the invention.

A profiler configured according to one series of embodiments comprises two distinct components: a profiling engine and an analytics engine. The profiling engine and the analytics engine are illustrated by the block diagrams depicted in FIGS. 1 and 2, respectively. The profiling engine 100 may comprise a shared library and routine filter 101, a call instrumentor 102, a thread tracker 103, a process tracker 104, and a data model generator 105. The analytics engine 200 may comprise a merging module 201, a pruning module 202, a context extractor 203, and a summary generator 204. According to some embodiments, the data model generator 105 may also reside within the analytics engine 200. Each component and module is described in further detail below.

A profiler configured according to one series of embodiments operates in two distinct modes: an online mode powered by the profiling engine 100 and an offline mode powered by the analytics engine 200. In online mode, the flow and duration of each subroutine call of a target application is monitored. Information about each subroutine call, including how the subroutine is called and the duration that the application spends within a subroutine call, is tracked and recorded. A data model of the application's execution flow is constructed using this information. In offline mode, the collected data is filtered and analyzed. The execution flow, computation time, and coverage of the various subroutines are presented to the user in the form of a visualization of the data model. Offline mode may be triggered in a number of different ways. In one embodiment, the profiler's offline mode may be configured to commence automatically at a predetermined time or after the profiler has been running in online mode for a designated length of time. In an alternate embodiment, the profiler's offline mode may be triggered manually by the user or administrator. In either embodiment, offline mode may be triggered either by the termination of online mode (or the target application) or by the execution of a subroutine within the application at which a checkpoint had been set. Upon hitting the checkpoint, the offline mode commences with the data gathered up to the checkpoint while the profiler continues gathering data subsequent to the checkpoint in a parallel online mode.

Figure 3:
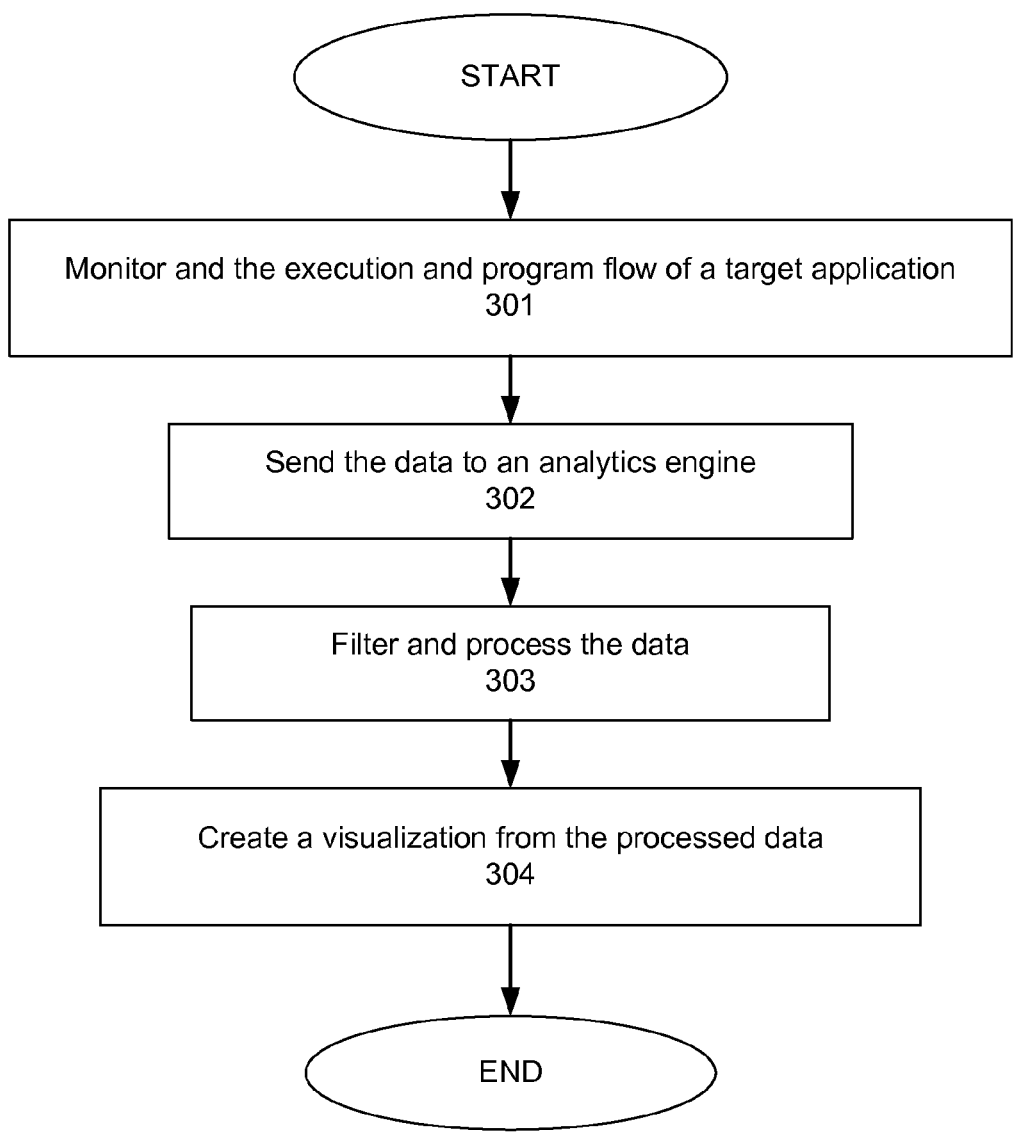
FIG. 3 depicts a flow diagram illustrating the operation of the invention according to an embodiment.

The operation of a profiler configured according to one series of embodiments is illustrated in further detail by the flow diagram 300 depicted in FIG. 3. The procedure begins at step 301 with monitoring the execution and program flow of a target application. The profiler does this by attaching itself to the target application. At step 302, the data is sent to an analytics engine 200. As described above, this may be triggered by the detachment of the profiler from the target application, the termination of the target application, the termination of the profiling engine 100, or by the execution of a subroutine within the target application at which a checkpoint had been set. At step 303, the analytics engine 200 filters and processes the data gathered up to that point. At step 304, the profiler creates a visualization from the processed data representing the flow and duration of each subroutine call within the target application, and the procedure ends.

In some circumstances, it may be desirable to restrict profiling to a subset of subroutines or functions within the application. This may be necessary to further minimize execution overhead or make the performance and execution data of complex applications easier to analyze. Thus, according to one series of embodiments, the profiling engine 100 includes a shared library and routine filter 101. The shared library and routine filter 101 enables profiling of subroutine calls originating from a set of predetermined subroutines. In one such embodiment, the shared library and routine filter 101 comprises a regular expression interpreter that is applied to names of particular subroutines. By default, the shared library and routine filter may simply use '*' as a regular expression, causing the profiling engine 100 to track every subroutine call in the target application.

According to one series of embodiments, the profiling engine 100 includes a call instrumentor 101. In these embodiments, the call instrumentor 101 inserts instrumentation commands into the target application's binary code. These commands signal subroutine calls and call-backs within the program flow, enabling the profiler to identify each subroutine called by the attached thread or process and determine the length of time spent executing the subroutine. In one such embodiment, instrumentation of the target application's binary code is facilitated by tools provided by the manufacturer of the system architecture. For example, the profiling engine 100 may attach to and detach from the target application via Pin, a dynamic binary instrumentation framework for 32- and 64-bit Intel architectures. In this embodiment, the profiling engine 100 attaches to a currently executing thread or process of the target application and tracks the application's subroutine calls by using the appropriate subroutine in Pin's application programming interface (API) library. Pin uses a just-in-time (JIT) compiler to recompile small portions of the target application's binary code, incorporating commands inserted by the call instrumentor 101. Based on the signals generated by the inserted instrumentation calls, the profiling engine 101 determines the execution flow of the target application and gathers metadata comprising the call counts and percentage of the application's execution time spent in each subroutine. According to one embodiment, the profiling engine 101 employs the target application's CPU counter and an internal timer to record the clock cycles per second and run time of a subroutine call.

One common tactic in software design that affects an application's execution flow in a manner that merits special consideration is recursion. A recursive function or subroutine is one that invokes itself either directly or indirectly. A profiler that does not account for recursive relationships between subroutine calls may double-count the execution time of a subroutine that calls itself by recording the time spent by the caller as well as the callee. This would result in inaccurate data, because in the case of a recursive subroutine call, the callee is essentially placed "on hold" while the callee finishes executing. Thus, according to one embodiment, the profiling engine 100 detects recursive subroutine calls and pauses an internal timer measuring the caller's execution time while the callee finishes executing. The profiler may further use a counter to keep track of how many levels of recursion corresponding to a subroutine have occurred within a thread.

Figure 4:
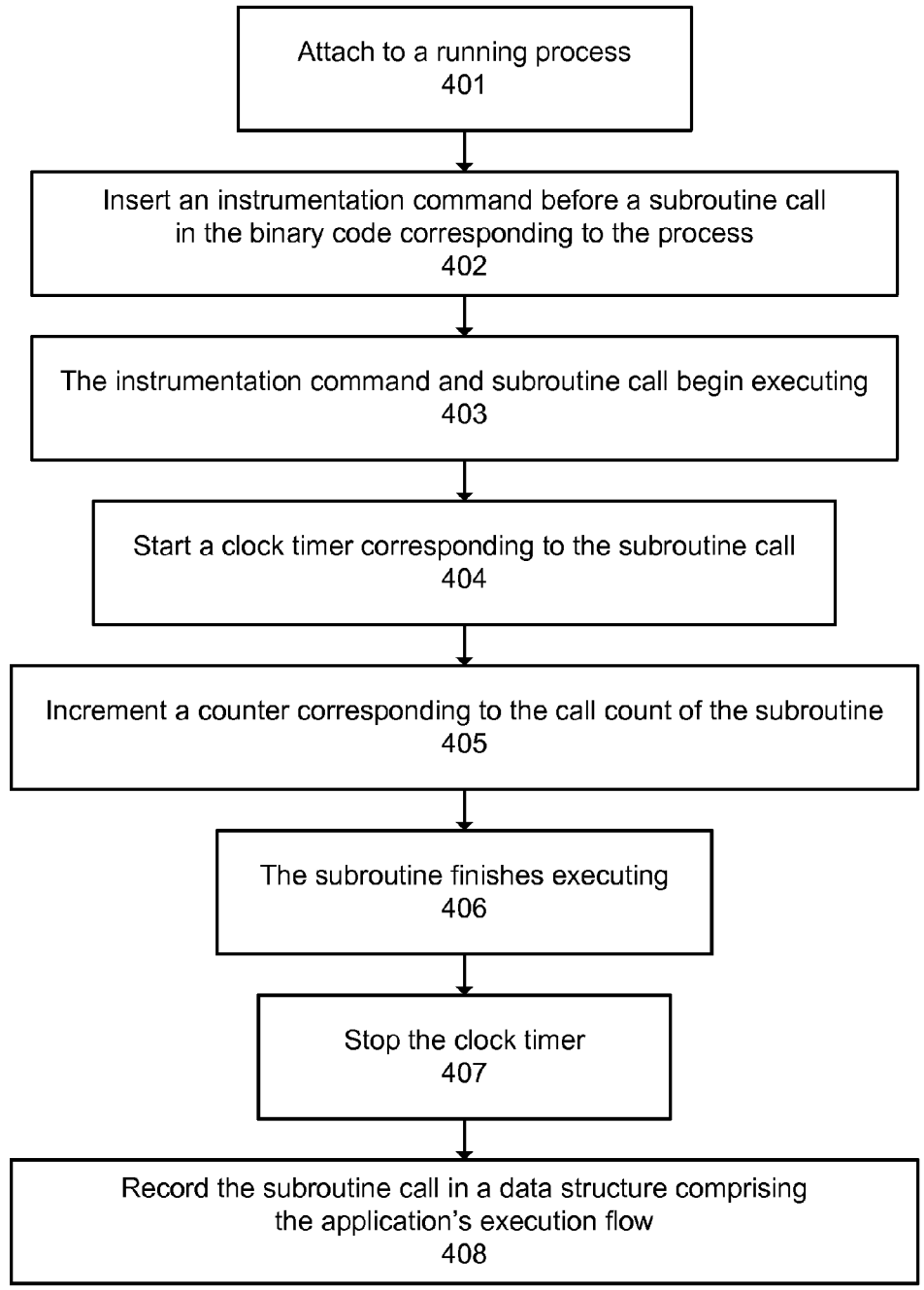
FIG. 4 depicts a flow diagram illustrating the operation of a call instrumentor according to an embodiment of the invention.

The operation of the call instrumentor 101, corresponding to step 301 of the flow diagram 300, is illustrated in further detail by the flow diagram 400 depicted in FIG. 4. At step 401, the profiling engine 101 attaches to a running thread or process. At step 402, the call instrumentor 101 inserts an instrumentation command before a subroutine call in the portion of the application's binary code corresponding to the attached thread or process. At step 403, the instrumentation command and subroutine call begin executing. At step 404, concurrent with step 403, a clock timer corresponding to the subroutine call is started. At step 405, a counter corresponding to the call count of the subroutine is incremented. At step 406, the subroutine finishes executing. At step 407, concurrently with step 406, the clock timer is stopped. At step 408, the subroutine call is recorded in a data structure comprising the application's execution flow.

Figure 5:
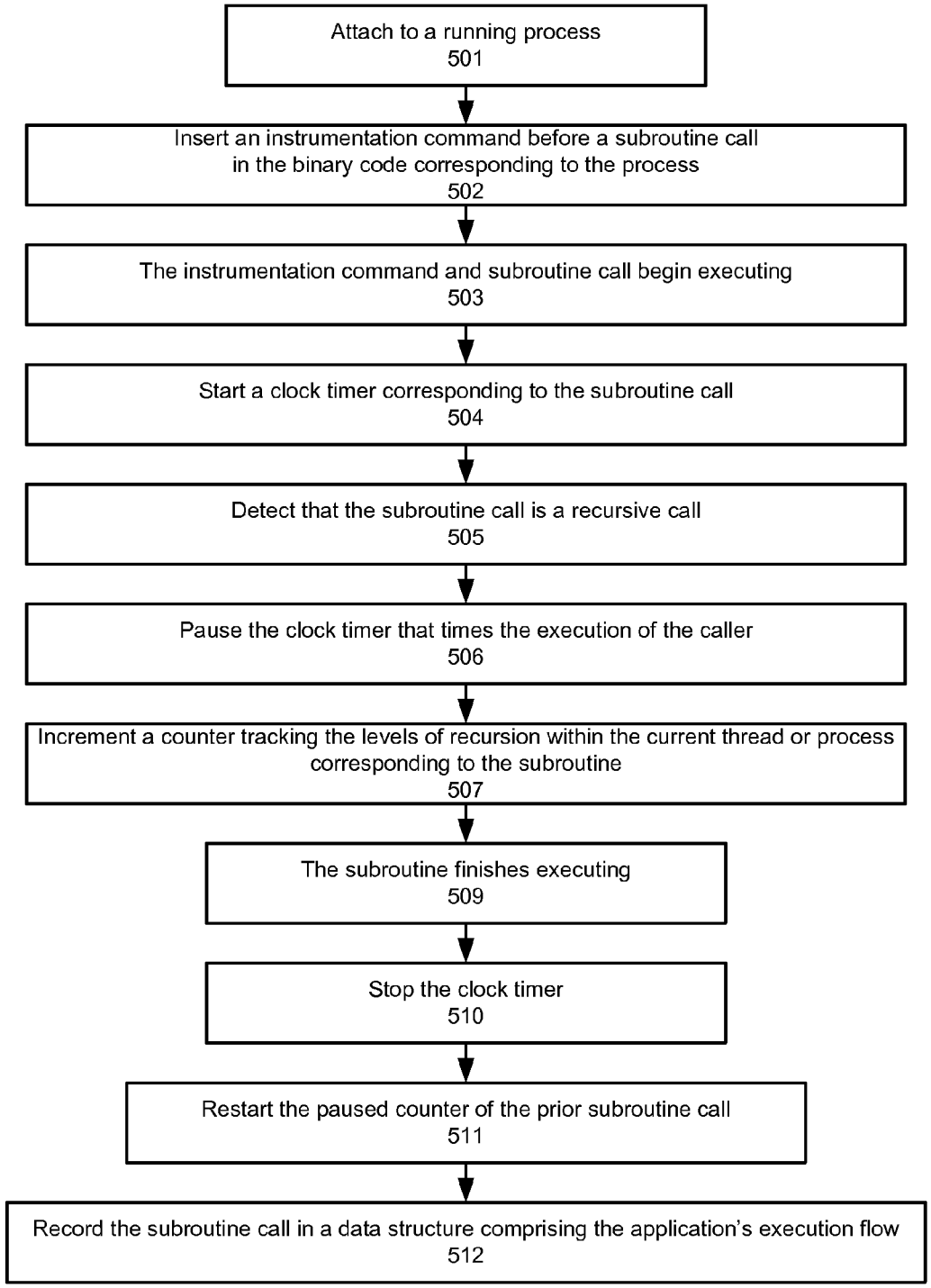
FIG. 5 depicts a flow diagram illustrating the operation of a call instrumentor according to an embodiment of the invention.

The operation of the profiling engine 100 and the call instrumentor 101 in the case of a recursive subroutine call is illustrated in further detail by the flow diagram 500 depicted in FIG. 5. At step 502, the profiling engine 101 attaches to a running thread or process. At step 502, the call instrumentor 101 inserts an instrumentation command before a subroutine call in the portion of the application's binary code corresponding to the attached thread or process. At step 503, the instrumentation command and subroutine call begin executing. At step 504, concurrent with step 503, a clock timer corresponding to the subroutine call is started. At step 505, the profiling engine 100 detects that the subroutine call is a recursive call. At step 506, the clock timer that times the execution of the caller (or, in the case of an indirect recursive call, the most recent prior called instance of the subroutine) is paused. At step 507, a counter tracking the levels of recursion within the current thread or process corresponding to the subroutine is incremented. At step 508, a counter tracking the call count of the subroutine is incremented. At step 509, the subroutine finishes executing. At step 510, concurrent with step 509, the clock timer is stopped. At step 511, also concurrent with step 509, the paused counter of the prior subroutine call is restarted. At step 512, the subroutine call is recorded in a data structure comprising the application's execution flow.

A data model tracking the execution of a target application may be generated on a per-thread or per-process basis. According to one series of embodiments, the profiling engine 100 includes a thread tracker 103. In one such embodiment, at run time, the call information for each thread is stored in a portion of memory dedicated to a given thread. This reduces, and in some cases eliminates, the need for locking call metadata capture data structures across threads. This strategy also helps in avoiding false cache-line-sharing between threads. The thread tracker may produce data models of the target application's execution flow and performance on a per-thread basis, thereby facilitating analysis of individual threads. The per-thread data models may subsequently be "merged" together by the analytics engine (described further below). In addition to monitoring thread-specific callbacks, the thread tracker 103 may also detect and monitor thread creation subroutines utilized within the application. This information may be used identify parent-child relationships between threads and to detect thread creation points within the target application.

Similarly, according to one series of embodiments, the profiling engine 100 includes a process tracker 104. The process tracker 104 is responsible for tracking child processes. Typically, in applications running on Unix-based systems, multi-process applications start as a single process and subsequently spawn new processes using the 'fork()' Unix system call. In one embodiment, the process tracker 104 tracks process creation by detecting calls to 'fork()'. When a new process is created, the process tracker 104 re-initializes call accounting information for the new process. This avoids double counting of the parent process' performance metrics in the child process. Similar to the thread tracker 103, the process tracker 104 may generate individual data models for all threads in child processes.

Figure 6:
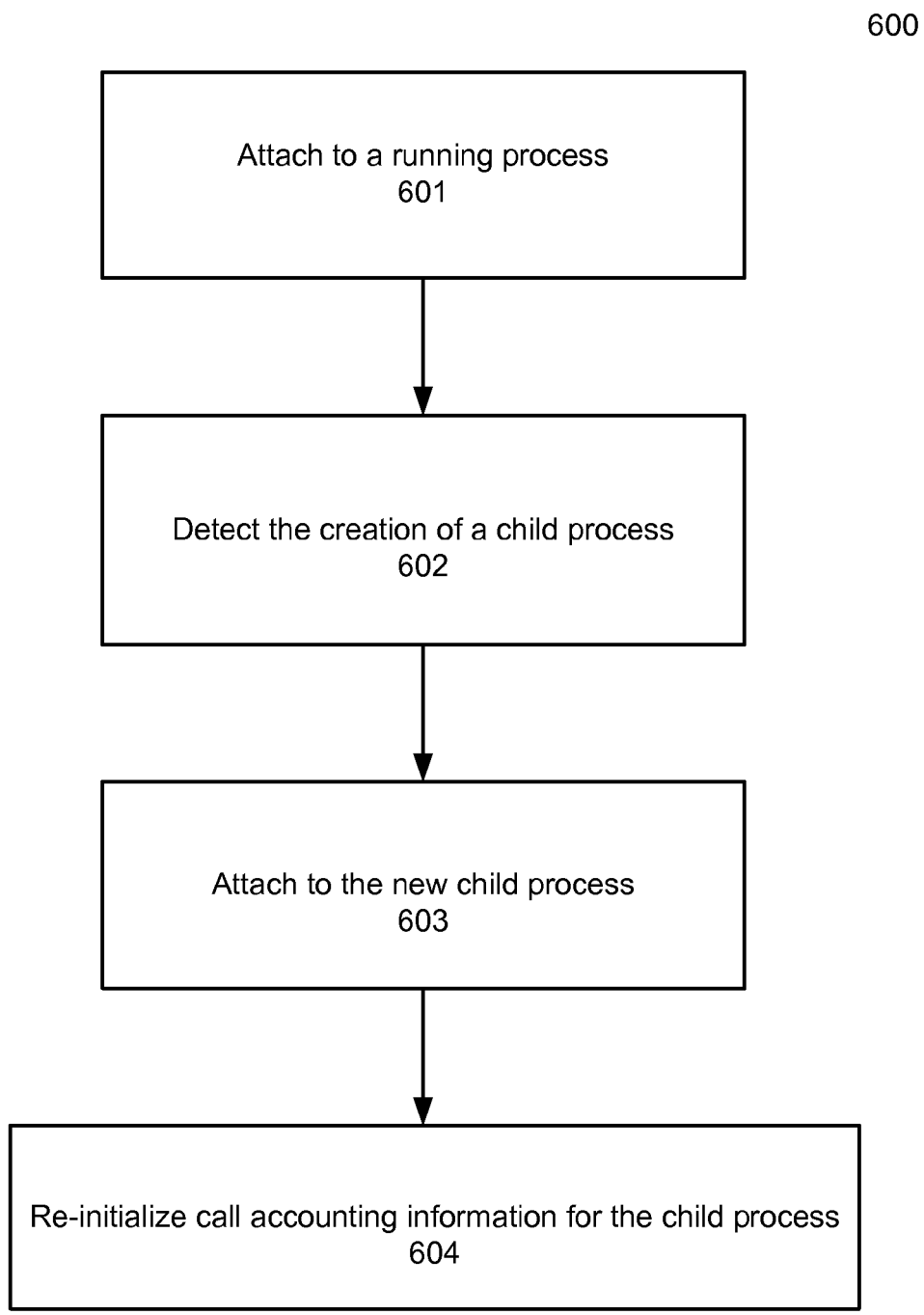
FIG. 6 depicts a flow diagram illustrating the operation of a process tracker according to an embodiment of the invention.

The operation of the process tracker 104 according to an embodiment is illustrated by the flow diagram 600 depicted in FIG. 6. At step 601, the profiling engine 100 attaches to a running process. At step 602, the creation of a child process is detected. As described above, according to some embodiments, this may occur by monitoring calls to the 'fork()' Unix system call. Any means of detecting the creation of a child process on any system architecture may be employed without deviating from the scope or spirit of the embodiments disclosed herein. At step 603, the profiling engine 100 attaches to the new child process. At step 604, call accounting information for the child process is re-initialized.

In many types of online applications, threads and processes may be idle for various reasons including, but not limited to, waiting to acquire a lock, waiting for a system resource to become available, and waiting for input/output operations to complete. In order to properly analyze the runtime behavior of such applications, it is important to quantify the amount of execution time spent in system subroutines that place a running thread or process in an idle state such as epoll_wait, pthread_cond_wait, pthread_cond_timedwait, sem_wait, lll_mutex_lock_wait and pread. This is not possible with tools such as VTune™, since they capture CPU cycles spent in the user space. In contrast, a profiler configured according to any of the embodiments disclosed herein reports the total wall clock time spent in such subroutines.

The execution and performance data gathered by the call instrumentor 102, the thread tracker 103, and the process tracker 104 is used to construct a data model representing the execution flow of the target application. This may be done on-the-fly in online mode or in offline mode after the requisite data has been gathered. According to one series of embodiments, this is performed by the data model generator 105. The data model generator 105 may build the data model at the termination of a thread or process or at arbitrary points in the application's execution flow. The attach/detach functionality described above enables the data model generator 105 to create data models for applications that run for indefinite durations. In addition, if the target application is known to terminate early in certain circumstances, the errant application can be sent a signal to generate a data model prior to its abnormal termination.

As described above, according to an embodiment, the profiler commences offline mode with the data collected by the profiling engine 100 up to that point. The offline mode is driven by the analytics engine 200. The merging module 201 of the analytics engine 200 merges the data models corresponding to the various threads and processes that were attached. According to an embodiment, merging is performed by determining, for each thread or process, the subroutine that spawned it and combining multiple invocations of each subroutine across threads or processes. Parent-child relationships between threads and processes are determined by the merging module 201 using relationship data kept by the thread tracker module 103 or performance tracker module 104. Merging all the invocations of the first subroutine executed by the different threads and processes may induce spurious cycles in the data model. To avoid this, the first subroutines executed by the different threads and processes are partitioned into subsets based on the nesting level of the different threads and processes. The subroutines in each subset are then merged.

Figure 7:
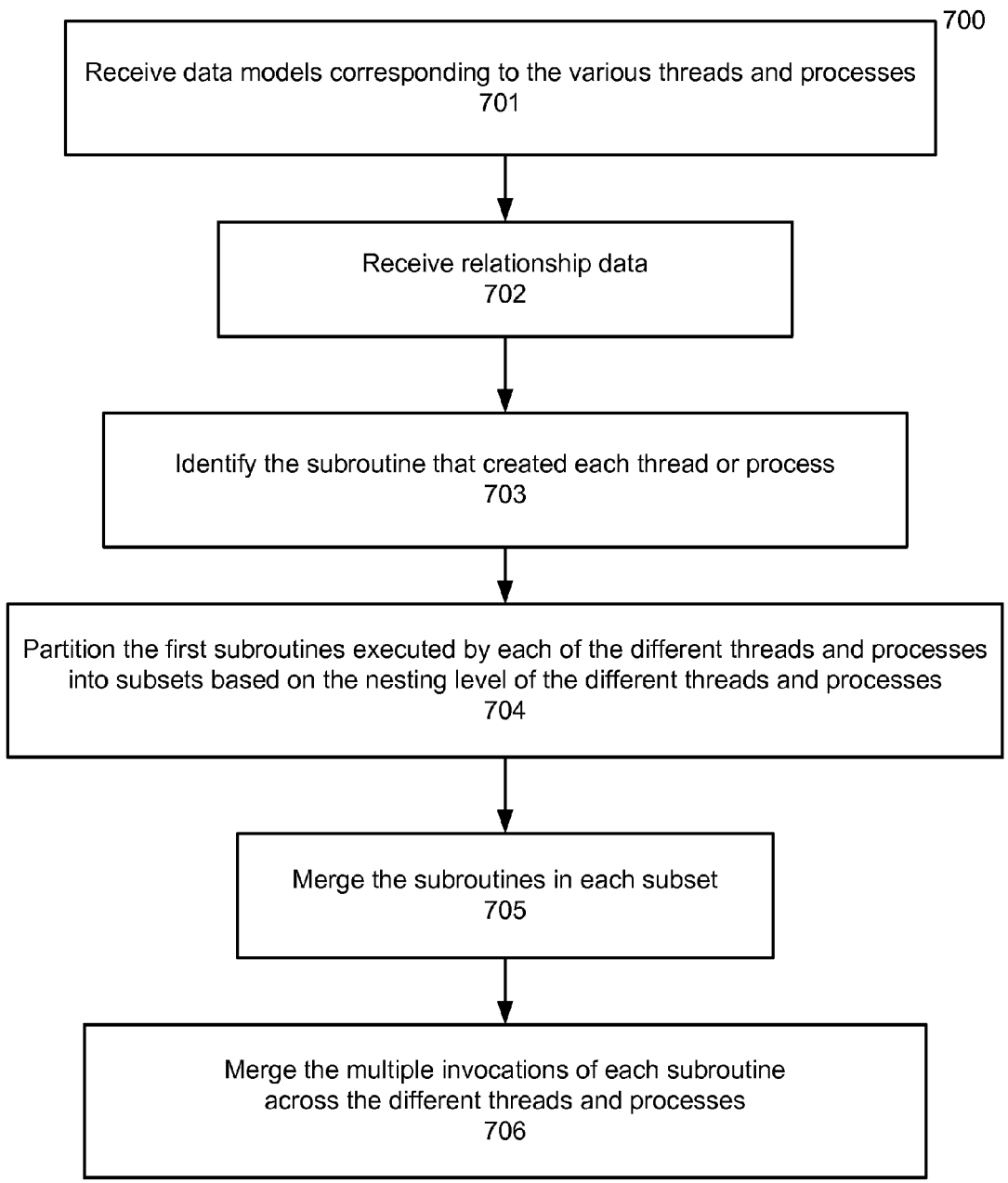
FIG. 7 depicts a flow diagram illustrating the operation of a merging module according to an embodiment of the invention.

The operation of the merging module 201 according to an embodiment is illustrated by the flow diagram 700 depicted in FIG. 7. At step 701, data models corresponding to the various threads and processes are received from the data model generator 105. At step 702, relationship data is received from the thread tracker module 103 or the process tracker module 104. At step 703, the subroutine that created each thread or process is identified using the data models and the relationship data. At step 704, the first subroutines executed by each of the different threads and processes are partitioned into subsets based on the nesting level of the different threads and processes. At step 705, the subroutines in each subset are merged. At step 706, multiple invocations of each subroutine across the different threads and processes are merged, resulting in a composite data model.

Many complex applications may have thousands of different subroutines and subroutine calls with varying degrees of importance. For such applications, it may be desirable to filter the data model such that only subroutines and subroutine calls that are of interest to a performance analyst are represented. Seldom-called subroutines and subroutine calls with short run times or low coverage are unlikely to cause performance bottlenecks and may be of minimal importance for optimization purposes. In addition, some subroutine calls may correspond to system commands or shared library functions that cannot be further optimized. For ease of analysis and to avoid clutter, performance analysts may wish to omit such subroutines and subroutine calls from visualizations of the data model representing a complex application. Thus, according to some embodiments, the pruning module 203 of the analytics engine 200 prunes merged and un-merged data models by removing subroutines and subroutine calls that are irrelevant or unimportant for optimization purposes.

Figure 8:
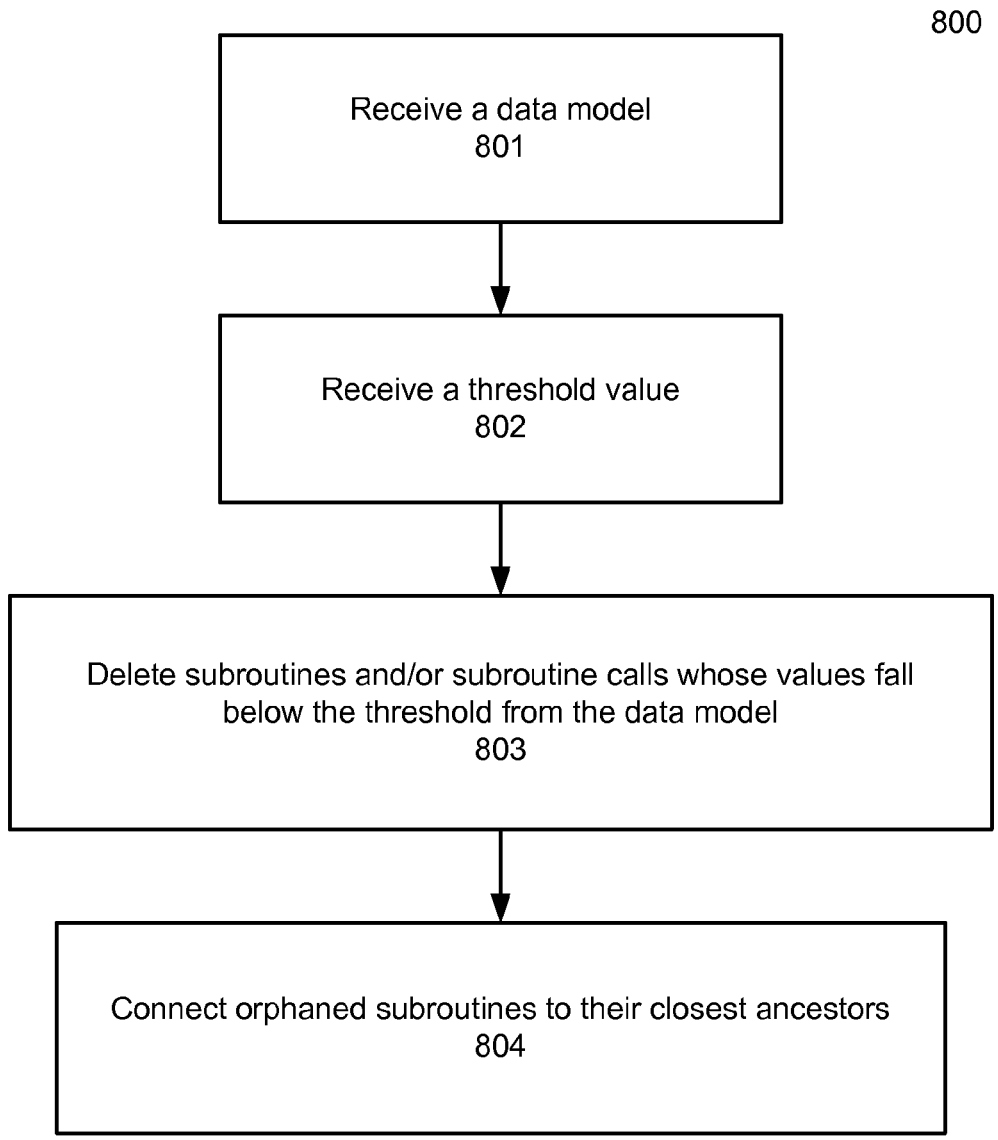
FIG. 8 depicts a flow diagram illustrating the operation of a pruning module according to an embodiment of the invention.

The operation of the pruning module 203 according to an embodiment is illustrated by the flow diagram 800 depicted in FIG. 8. At step 801, a data model is received. The data model may be a consolidated data model received from the merging module 201 or a per-thread or per-process data model received from the data model generator 105. At step 802, a threshold value is received. The threshold may pertain to the coverage or run time of a subroutine or subroutine call. The threshold may be a default threshold value or user-specified. At step 803, subroutines and/or subroutine calls whose values fall below the threshold are deleted from the data model. This may result in orphaned subroutine calls whose values are above the threshold and are thus retained within the data model, but are disconnected due to the deletion of intermediate subroutines or subroutine calls. Thus, in step 804, orphaned subroutines are connected to their closest ancestors, resulting in a pruned but complete data model.

In one such embodiment, the data model created by the data model generator 105 is a call graph. The examples discussed and illustrated herein incorporate call graphs. However, any data model may be used without deviating from the spirit or scope of the embodiments disclosed herein. A call graph comprises nodes corresponding to subroutines and edges corresponding to the calling relationships between them. Specifically, a node represents a subroutine and an edge(a, b) indicates that subroutine a has called subroutine b. According to one embodiment, a node comprises a two element vector, wherein the first element represents the call count of the subroutine and the second element represents the coverage of the subroutine corresponding to the given node. Edges may be similarly modeled as a two element vector, wherein the first element represents the count of the call represented by the edge and the second element represents the coverage of that particular call.

Figure 9:
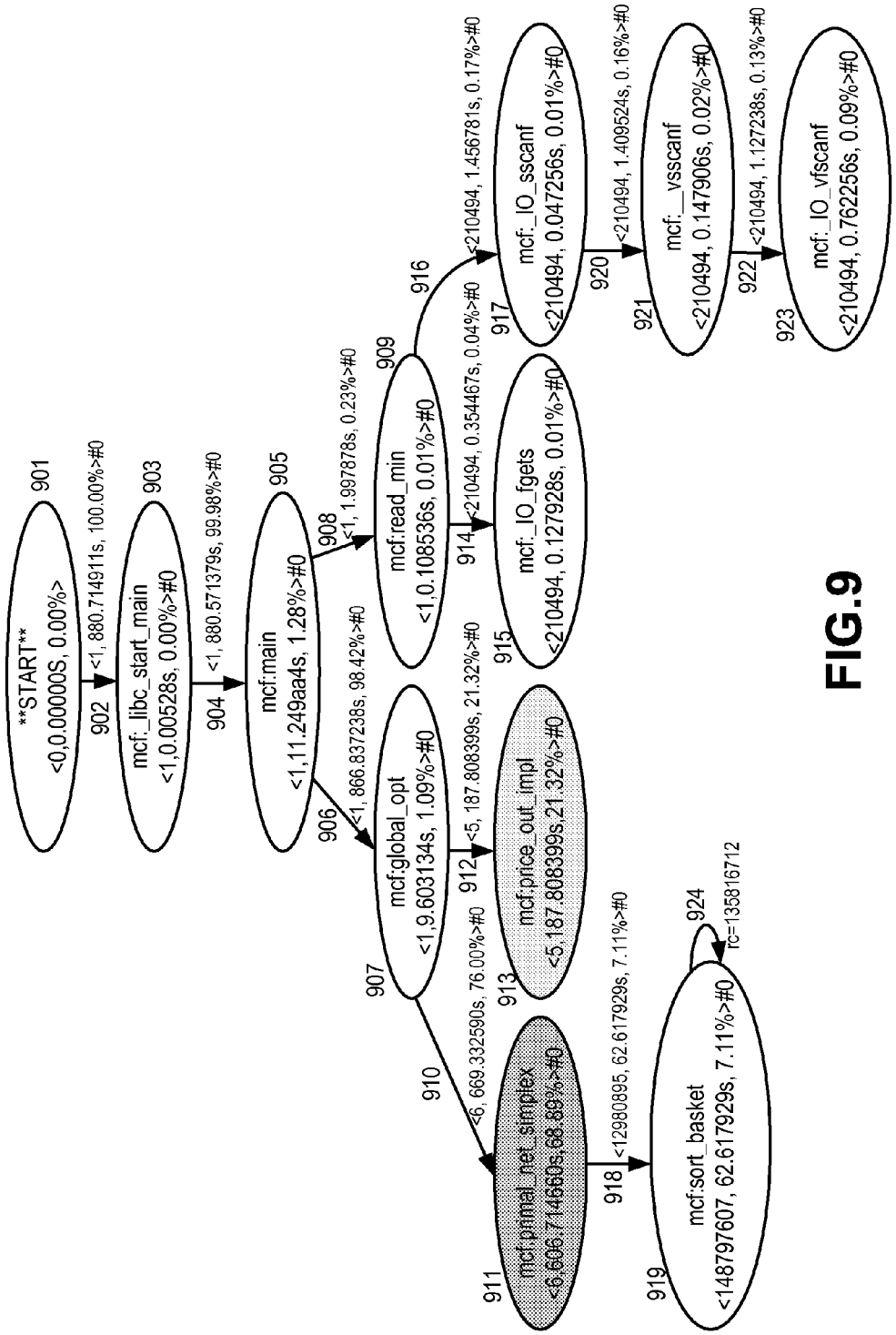
FIG. 9 depicts an example visualization of a call graph according to an embodiment of the invention.

An example visualization of a call graph 900 is depicted in FIG. 9. The depicted example partially illustrates the execution flow of an application called mcf. The start of the application is represented by node 901 labeled 'START'. The vector within each node represents the call count, run time, and coverage of the subroutine corresponding to that node. For example, node 905 shows that the subroutine main was called once, ran for 11.249114 seconds, and that the application spent 1.28% of its run time executing code within main. Similarly, the vector alongside each edge represents count (specifically, the number of instances that the callee was invoked by the caller), the run time, and coverage of the call corresponding to that edge. For example, edge 910 shows that the subroutine primal_net_simplex represented by node 911 was called 6 times by the subroutine global_opt represented by node 907, that this call ran for 669.332590 seconds, and that this call accounted for 76.00% of the application's total run time. In contrast with the run times and coverage percentages shown in the vectors alongside the edges, the run times and coverage percentages shown in the vectors within the nodes pertain only to execution of the code within the corresponding subroutine, not other subroutines called by that subroutine. The percentages within the vectors alongside the edges represent the entire call, including subroutines invoked by the callee. Thus, the percentages and run times within the vectors alongside the edges are cumulative.

According to one series of embodiments, a visualization of a call graph may include annotations to identify aspects of the target application's execution flow that may of particular significance to a performance analyst. In the visualization 900, node 911 representing subroutine primal_net_simplex is shaded dark grey to indicate a "hot" subroutine, i.e., a subroutine with high coverage. Similarly, node 913 representing price_out_impl is shaded light grey to indicate a subroutine with high coverage, though not as high as primal_net_simplex. The edge 924 represents a recursive subroutine call, i.e., the subroutine sort_basket represented by node 919 called itself. The recursion count is indicated by rc=135816712. Thus, from the vectors alongside edge 924 and within node 919, it can be determined that of the 148797607 instances that subroutine sort_basket was called, 135816712 were recursive calls. Because the run time and coverage of recursive subroutine calls are already represented in the figures listed within the node, they do not need to be listed separately.

Figure 10A:
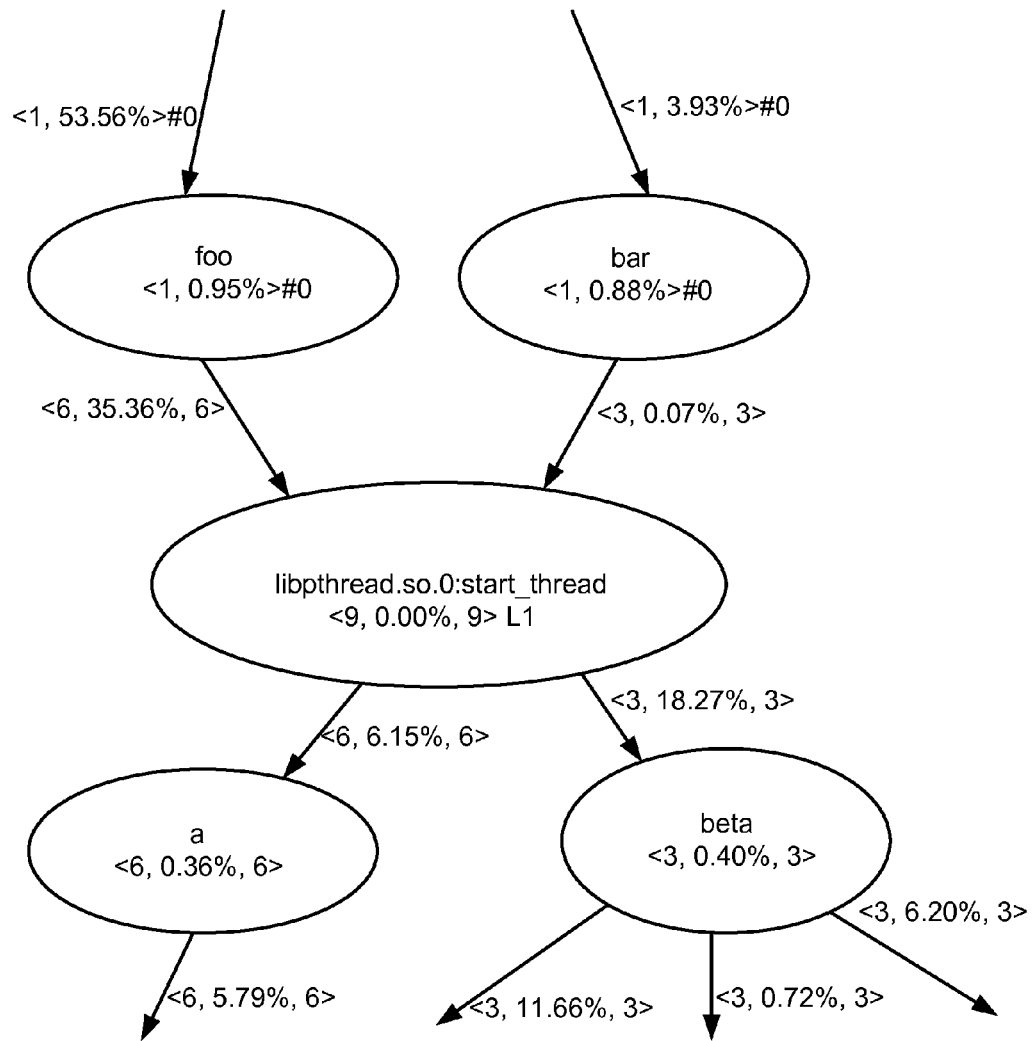
FIG. 10A depicts an example visualization of a call graph according to an embodiment of the invention.

FIG. 10A illustrates a visualization of a partial call graph 1000. The following can be noted from the visualization 1000: (a) by their invocation of the subroutine start_thread, subroutines foo and bar spawn 6 and 3 threads respectively, and (b) the callees of foo and bar are the subroutines a (with a call count of 6) and beta (with a call count of 3). From call graph 1000, it is not possible to determine the caller-callee relationship between {foo, bar} and {a, beta} and the corresponding call counts, because it is unclear which thread each subroutine was called from. This information can potentially be of importance in optimizations such as inlining and subroutine versioning.

Figure 10B:
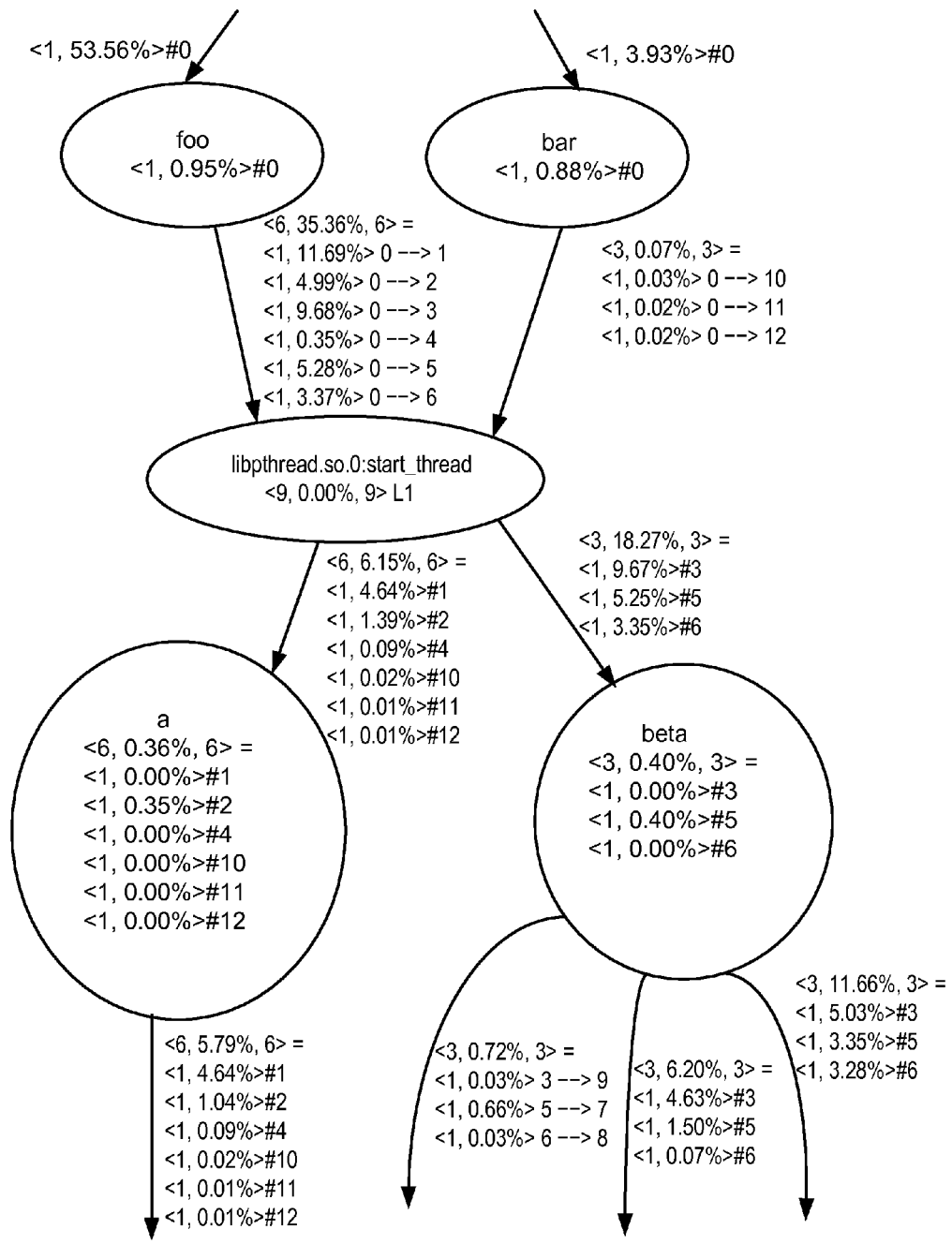
FIG. 10B depicts an example visualization of a call graph according to an embodiment of the invention.

To this end, according to one series of embodiments, the analytics engine 200 includes a content extractor 203 that facilitates demand-driven context extraction. For example, the call graph 1050 depicted in FIG. 10B details the thread context for the partial call graph shown in FIG. 10A. Note that the vector corresponding to the edge foo→libpthread.so.0: start_thread is dissected into 6 thread-specific vectors. The notation 0→1 signifies that Thread #0 spawned Thread #1. From the thread-specific vector inside the node corresponding to subroutine a, it can be determined that Thread #1 executed subroutine a. On further analysis, based on the context information, it can be concluded that the subroutine beta was called only by subroutine foo, whereas the subroutine a was called by both the subroutines foo and bar.

According to one series of embodiments, the analytics engine 200 includes a summary generator 204. The summary generator 204 generates a summary of the call graph extracted by the data model generator 105. The summary comprises metrics that characterize the call graph such as the number of nodes and the number of edges. Additionally, application properties such as the number of direct and indirect calls, hottest subroutines, and hottest edges are reported. The shared libraries used by the application and their respective coverages may also be reported. A summary for the example visualization 900 depicted in FIG. 9, generated by the summary generator 204, is depicted in FIG. 11.

FIG. 12 is a diagrammatic representation of a network 1200, including nodes for client computer systems $1202_1$ through $1202_N$, nodes for server computer systems $1204_1$ through $1204_N$, nodes for network infrastructure $1206_1$ through $1206_N$, any of which nodes may comprise a machine 1250 within which a set of instructions for causing the machine to perform any one of the techniques discussed above may be executed. The embodiment shown is purely exemplary, and might be implemented in the context of one or more of the figures herein.

Any node of the network 1200 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 1250 includes a processor 1208 (e.g. a processor core, a microprocessor, a computing device, etc), a main memory 1210 and a static memory 1212, which communicate with each other via a bus 1214. The machine 1250 may further include a display unit 1216 that may comprise a touch-screen, or a liquid crystal display (LCD), or a light emitting diode (LED) display, or a cathode ray tube (CRT). As shown, the computer system 1250 also includes a human input/output (I/O) device 1218 (e.g. a keyboard, an alphanumeric keypad, etc), a pointing device 1220 (e.g. a mouse, a touch screen, etc), a drive unit 1222 (e.g. a disk drive unit, a CD/DVD drive, a tangible computer readable removable media drive, an SSD storage device, etc), a signal generation device 1228 (e.g. a speaker, an audio output, etc), and a network interface device 1230 (e.g. an Ethernet interface, a wired network interface, a wireless network interface, a propagated signal interface, etc).

The drive unit 1222 includes a machine-readable medium 1224 on which is stored a set of instructions (i.e. software, firmware, middleware, etc) 1226 embodying any one, or all, of the methodologies described above. The set of instructions 1226 is also shown to reside, completely or at least partially, within the main memory 1210 and/or within the processor 1208. The set of instructions 1226 may further be transmitted or received via the network interface device 1230 over the network bus 1214.

It is to be understood that the embodiments disclosed herein may be used as, or to support, a set of instructions executed upon some form of processing core (such as the CPU of a computer) or otherwise implemented or realized upon or within a machine- or computer-readable medium. A machine-readable medium includes any mechanism for storing information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

The invention claimed is:

1. A computer implemented method for extracting a data model of a target application's performance and execution flow so as to guide optimization of the target application, the method comprising:
   attaching a profiler, using a computer, to the target application;
   inserting, using a computer, at least one instrumentation command into a portion of binary code of the target application preceding a call of a subroutine;
   incrementing, in a computer, a counter corresponding to a number of calls of the subroutine;
   starting, in a computer, a timer corresponding to a time of execution for the call;
   appending, in a computer, the call to a data structure, wherein the data structure tracks a call flow of the target application;
   stopping, in a computer, the timer upon completion of the subroutine; and
   building, in a computer, the data model using the data structure.

2. The computer implemented method of claim 1, the method further comprising:
   detecting, using a computer, that the call is a recursive call;
   incrementing, in a computer, a counter corresponding to a number of levels of recursion;
   pausing, in a computer, a prior timer corresponding to a most recent call of the subroutine; and
   restarting, in a computer, the prior timer upon completion of the subroutine.

3. The computer implemented method of claim 1, wherein the target application comprises at least one process, and the process is attached to the profiler.

4. The computer implemented method of claim 1, wherein the target application comprises at least one thread, and the thread is attached to the profiler.

5. The computer implemented method of claim 1, wherein the data model is a call graph and wherein the call graph corresponds to at least one of a thread or a process.

6. The computer implemented method of claim 1, further comprising accessing a subroutine filter, and wherein the subroutine is specified in the subroutine filter.

7. The computer implemented method of claim 1, further comprising generating at least one of a visualization and a summary of the data model.

8. The computer implemented method of claim 1, further comprising:
   receiving, at a computer, at least one related data model;
   receiving, at a computer, relationship data corresponding to the data model and the related data model;
   determining, in a computer, using the relationship data, a creating subroutine for each of the data model and the related data model;
   partitioning, using a computer, for each of the data model and the related data model, a first subroutine into a plurality of subsets, wherein each subset corresponds to a nesting level, and each subset comprises at least one first subroutine;
   merging, using a computer, the first subroutines in each subset; and
   merging, using a computer, a plurality of invocations corresponding to each subroutine.

9. The computer implemented method of claim 1, further comprising;
   determining, using a computer, a threshold value;
   deleting, using a computer, at least one omitted subroutine and at least one omitted subroutine call from the data model, wherein the subroutine and the subroutine call do not meet the threshold; and
   connecting using a computer, at least one orphaned subroutine to at least one ancestor subroutine.

10. The computer implemented method of claim 1, further comprising:
    determining, using a computer, that the subroutine triggers an idle state;
    starting an idle state timer; and
    stopping the idle state timer upon completion of the subroutine.

11. A non-transitory computer readable medium that stores a set of instructions which, when executed by a computer, cause the computer to execute steps for extracting a data model of a target application's performance and execution flow so as to guide optimization of the target application, the steps comprising:
    attaching a profiler, using a computer, to the target application;
    inserting, using a computer, at least one instrumentation command into a portion of binary code of the target application preceding a call of a subroutine;
    incrementing, in a computer, a counter corresponding to a number of calls of the subroutine;
    starting, in a computer, a timer corresponding to a time of execution for the call;
    appending, in a computer, the call to a data structure, wherein the data structure tracks a call flow of the target application;
    stopping, in a computer, the timer upon completion of the subroutine; and
    building, in a computer, the data model using the data structure.

12. The computer readable medium of claim 11, the steps further comprising:
    detecting, using a computer, that the call is a recursive call;
    incrementing, in a computer, a counter corresponding to a number of levels of recursion;
    pausing, in a computer, a prior timer corresponding to a most recent call of the subroutine; and
    restarting, in a computer, the prior timer upon completion of the subroutine.

13. The computer readable medium of claim 11, wherein the target application comprises at least one process, and the process is attached to the profiler.

14. The computer readable medium of claim 11, wherein the target application comprises at least one thread, and the thread is attached to the profiler.

15. The computer readable medium of claim 11, wherein the data model is a call graph and wherein the call graph corresponds to at least one of a thread or a process.

16. The computer readable medium of claim 11, the steps further comprising accessing a subroutine filter, and wherein the subroutine is specified in the subroutine filter.

17. The computer readable medium of claim 11, the steps further comprising generating at least one of a visualization and a summary of the data model.

18. The computer readable medium of claim 11, the steps further comprising:
- receiving, at a computer, at least one related data model;
- receiving, at a computer, relationship data corresponding to the data model and the related data model;
- determining, in a computer, using the relationship data, a creating subroutine for each of the data model and the related data model;
- partitioning, using a computer, for each of the data model and the related data model, a first subroutine into a plurality of subsets, wherein each subset corresponds to a nesting level, and each subset comprises at least one first subroutine;
- merging, using a computer, the first subroutines in each subset; and
- merging, using a computer, a plurality of invocations corresponding to each subroutine.

19. The computer readable medium of claim 11, the steps further comprising;
- determining, using a computer, a threshold value;
- deleting, using a computer, at least one omitted subroutine and at least one omitted subroutine call from the data model, wherein the subroutine and the subroutine call do not meet the threshold; and
- connecting using a computer, at least one orphaned subroutine to at least one ancestor subroutine.

20. The computer readable medium of claim 11, the steps further comprising:
- determining, using a computer, that the subroutine triggers an idle state;
- starting an idle state timer; and
- stopping the idle state timer upon completion of the subroutine.

* * * * *